Nov. 29, 1960 J. R. HORSCH 2,962,657
FERROMAGNETIC PULSE AREA STABILIZER
Filed May 9, 1956
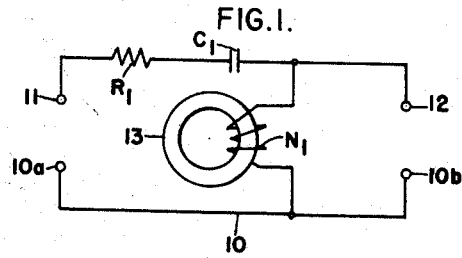
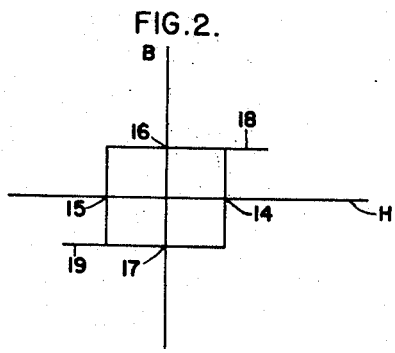
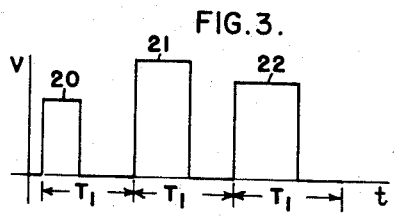
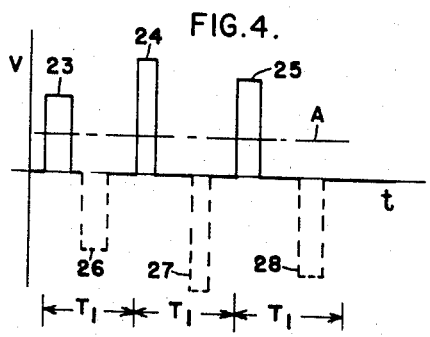
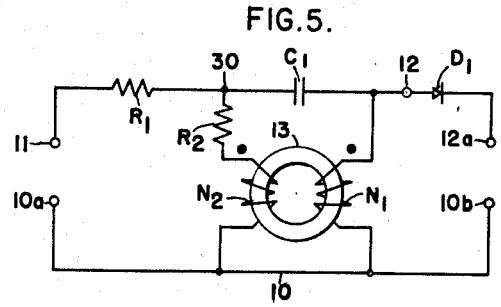
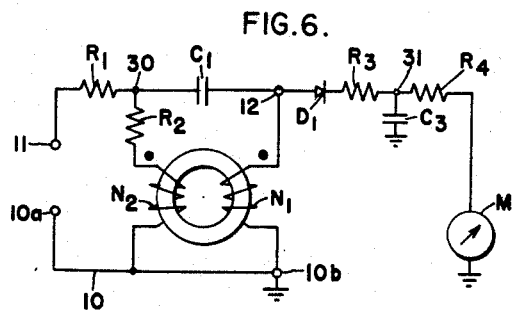
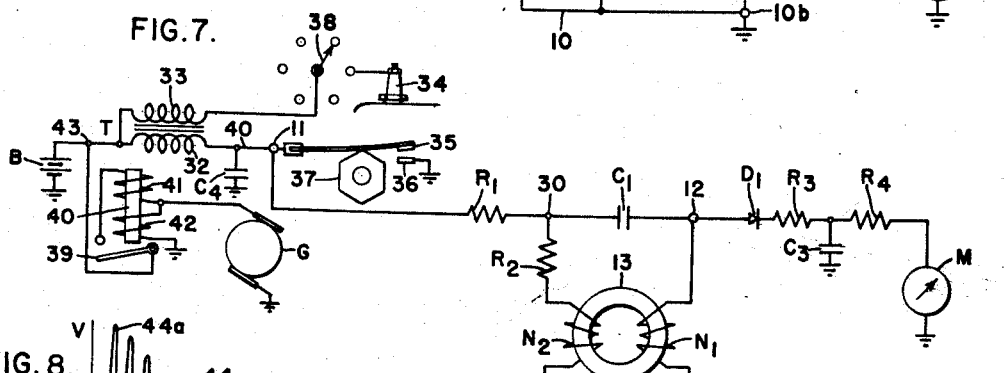
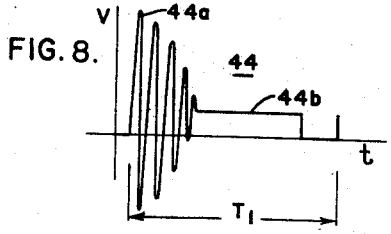
INVENTOR:
JAMES R. HORSCH,
BY Robert J. Steinmeyer
HIS ATTORNEY.

United States Patent Office 2,962,657
Patented Nov. 29, 1960

2,962,657

FERROMAGNETIC PULSE AREA STABILIZER

James R. Horsch, Elmhurst, Ill., assignor to General Electric Company, a corporation of New York Filed May 9, 1956, Ser. No. 583,667

17 Claims. (Cl. 324—70)

This invention relates to a passive ferromagnetic device which stabilizes the volt-time area of signal pulses and to a frequency meter utilizing such a device.

Frequency meters which cover the audio spectrum, especially those which must operate on pulses and other complex wave forms subject to amplitude and width variation, have in the past been either bulky and correspondingly expensive, or else inaccurate and correspondingly unreliable. For this reason, internal combustion engine tachometers, for example, are generally of a purely mechanical, or at least semi-mechanical, nature and thus require a mechanical linkage to some moving engine part. It has in the past been proposed to utilize a pulse output derived from the spark coil of the conventional ignition system of an internal combustion engine as a measure of the speed of operation of the engine. In practice, however, such systems have proven impractical or prohibitively expensive for several reasons. First of all it is not desirable to seriously load the spark coil of the ignition system since appreciable loading results in a substantial reduction of the peak value of the oscillating voltage applied to the spark plugs of the engine. Furthermore, the D.-C. voltage applied to the spark coil from a storage battery will in practice vary with the state of charge of the battery, so that the pulses obtainable not only have a complex leading portion, but also have a variable D.-C. component or volt-time area. Any system reading the average pulse energy as a measure of the frequency of pulse occurrence must, however, be supplied with pulses of constant volt-time area rather than with the complex and variable volt-time area pulses available. It has consequently proven difficult and expensive to obtain a device which affords an accurate and purely electrical measure of the speed of operation of the engine without impairing the efficiency of the ignition system of the engine.

The difficulties exemplified by the problems encountered in engine tachometers illustrate the need for a device which will extract a stabilized volt-time area from bi-directional or uni-directional pulses which may have simple or complex wave forms and which may be of varying amplitude and/or duration. Additionally, the device should afford D.-C. isolation of input and output, and the input impedance of the device should be such as not to substantially load the pulse source. Such a device would, of course, find general utility in providing a uniform input to counting or frequency measuring systems, but is particularly well adapted for use in an automobile engine tachometer.

It is therefore an object of this invention to provide a novel pulse area stabilizing device.

It is a further object of this invention to provide a frequency meter utilizing such a device.

It is a further object of this invention to provide a novel internal combustion engine tachometer.

It is a further object of this invention to provide a novel electrical network.

It is a more specific object of this invention to provide a pulse area stabilizing device or network whose input impedance may be readily controlled and which incorporates a ferromagnetic element and means for automatically resetting the flux in said element so that the device may be used with either bi-directional or uni-directional pulses in counting or frequency measuring applications.

Briefly stated, in accordance with one aspect of my invention, a magnetic circuit preferably having a substantially rectangular B-H characteristic is provided with at least one electric winding which is included in an electrical network also including at least a capacitor between the input and the output terminal thereof. This capacitor affords D.-C. isolation between the input and output in addition to resetting the core flux after each applied pulse has carried the core from saturation in one sense to saturation in an opposite sense. The resulting output pulses are of uniform volt-time area and may be used in conjunction with any averaging indicator or counter to measure the frequency of the input pulses.

While the novel and distinctive features of the invention are particularly pointed out in the appended claims, a more expository treatment of the invention, in principle and detail, together with additional objects and advantages thereof, is afforded by the following description and accompanying drawings of representative embodiments in which:

Like reference characters are used to designate like parts throughout and wherein:

Figure 1 is a schematic circuit diagram of one embodiment of the invention.

Figure 2 illustrates an idealized B-H relationship for the ferromagnetic circuit which is particularly advantageous in the practice of the principles of the invention.

Figure 3 illustrates as a volt-time waveshape signal impulses which may be applied to the circuit of Figure 1.

Figure 4 illustrates the waveshape of the voltage impulses observed at the output of the circuit of Figure 1 in response to the applied impulses of Figure 3.

Figure 5 is a circuit diagram of another embodiment of the invention.

Figure 6 is a circuit diagram illustrating how the circuit of Figure 5 may be utilized as a frequency meter.

Figure 7 is a circuit diagram illustrating how the frequency meter of Figure 6 may be connected as an internal combustion engine tachometer.

Figure 8 illustrates as a volt-time waveshape typical signal impulses which are applied to the input of the tachometer of Figure 7 from the spark coil of the ignition system of the engine.

While particular configurations have necessarily been chosen for convenience in illustration and discussion, it is to be noted that the principles of the invention may be advantageously applied in networks and environments different from the illustrations, but which still embody the essence of the invention.

Referring now in detail to Figure 1 of the drawings, there is shown the ferromagnetic circuit 13 which may be of annular form, although any other mechanical configuration providing an effectively closed magnetic circuit, or one with negligible air-gap influence may be employed. The material in the magnetic circuit 13 may be of any magnetic substance having appreciable remanence. In the present state of the art, materials in which the B-H characteristic is substantially rectangular in form and having a squareness ratio $B_r/B_s$ of 0.8 or more have been found useful, as for example, the nickel-iron alloys designated in the trade as Orthonol, Permalloy, and Delta-max. Winding N1 is wound upon the magnetic circuit 13 and links with the magnetic flux traversing this circuit. One end of the winding N1 is connected over the common conductor 10 to an input terminal 10a and to an output terminal 10b. This arrangement is, of course, electrically equivalent to providing a common terminal. The other end of winding N1 is connected to an output terminal 12. A resistor R1 and a capacitor C1 are also connected in electrical series relationship between an input terminal 11 and the output terminal 12.

The magnetic circuit 13 has a substantially rectangular B-H characteristic, such as shown in Figure 2. In Figure 2, the H axis intercepts 14 and 15 represent respectively $+H_c$ and $-H_c$, while the B axis intercepts 16 and 17 represent respectively $+B_r$ and $-B_r$ where these designations have the significance given them in the work entitled, "Magnetic Circuits and Transformers," published in 1947 by John Wiley & Sons, Inc. The flux densities corresponding respectively to the points 18 and 19 on the B-H characteristic of Figure 2 may be designated respectively as $+B_s$ and $-B_s$ and represent respectively the positive and negative saturation values of the flux. For the purposes of this discussion it may be assumed that, initially, the flux in the core 13 of Figure 1 is at the $-B_r$ level indicated at 17, and that current flow occurring in the winding N1 in response to the application of signal impulses to the terminals 11 and 10a tends to change the magnetic state of the core 13 to the $+B_r$ level indicated at 16.

The operation of the circuit of Figure 1 may then be more clearly understood from a consideration of the input pulse waveforms shown in Figure 3 and the output pulse waveforms shown in Figure 4. When a train of pulses such as 20, 21, and 22 having different or variable volt-second areas are applied to the input terminals 11 and 10a, they appear across the coil N1 through the filter and current limiting resistor R1 and the reset capacitor C1. The polarity of the pulses should be such as to drive the core from negative saturation toward positive saturation and each of the pulses must have a volt-second area sufficient to produce a flux $2\phi$ where $\phi$ is the flux produced in driving the core from the H axis to saturation values $+B_s$ or $-B_s$. When the pulse 20 is first applied the winding N1 presents a high impedance and the major portion of the pulse will appear across it and at the output terminals 12 and 10b. A flux change, $\Delta\phi$ will be produced in the core 13 in accordance with the well known relation Equation 1:

$$\frac{1}{N}\int_0^{\Delta t} E\,dt = \Delta\phi$$

But the amount of flux change $\Delta\phi$ required to carry the core from its negative saturation value to its positive saturation value is a constant determined by the core geometry and material. This constant is proportional to the distance between the points 16 and 17 along the B axis in Figure 2. Consequently from Equation 1, the minimum volt-second area required to accomplish this change of state is also a constant, the value of which may be determined by a design of the core to adapt the system to the minimum volt-second area of the pulses in any source one desires to use. Once the core has reached positive saturation the winding N1 presents a very low impedance, the potential of output terminal 12 drops to substantially that of the common terminal 10b and the rest of the input pulse is applied primarily to capacitor C1 which then charges very rapidly. When the input pulse ends, capacitor C1 discharges through the winding N1 to the source by way of resistance $R_1$ and thereby resets the core to its negative saturation value, so that it is again ready to respond to another pulse having the same polarity as the first input pulse.

These relationships may be seen graphically from the waveforms of Figures 3 and 4. Variable volt-time area pulses 20, 21, and 22 are applied to terminals 11 and 10a. The only restriction on these pulses is that each must be such as to have a value of $$\int_0^{\Delta t} E\,dt$$

sufficient to produce a flux equal to $2\phi$ where $\phi$ is the flux necessary to carry the core from an unsaturated condition to either positive or negative saturation. It is obvious, as noted above, that $2\phi$ is then the flux required to carry the core from negative to positive saturation. Pulses 23, 24, and 25 appear at output terminal 12. Although the amplitude of each of these pulses is proportional to the amplitude of the corresponding input pulse, the time duration of the output pulses varies in such a fashion that the volt-time area of each of these pulses is the same, regardless of how much greater the volt-time area of the corresponding input pulse may be. This results, it will be recalled, from the fact that as soon as enough flux has passed through the core to carry it from saturation in one direction to saturation in an opposite direction, the winding N1 becomes virtually a short circuit and no pulse output appears. Thus, the constant flux required for this process results in constant volt-time area pulses 23, 24 and 25.

When the input pulse 20 ends, the capacitor C1 discharges through the core and a negative going pulse 26 consequently appears at the output terminal 12. This negative going pulse may be utilized if desired, or may be blocked by a suitably poled diode, D1, as shown for example, in Figure 5. In either event, the average or D.-C. value A of either the positive going or the negative going output pulses from input pulses of constant frequency, $T_1$, but of variable volt-time area pulse is derived from each of the input pulses and is taken as an output pulse, the average value of the output pulses of like polarity will depend only upon the frequency of the input pulse and not upon the volt-time area of the individual input pulses. Hence, this average value may be used as a measure of the frequency of the input pulses in a manner to be described below.

In Figure 5 there is shown a circuit similar to that of Figure 1 to which there has been added the diode D1 which, as mentioned above, serves to block the negative going pulses from the output taken at terminal 12a, and a second winding N2 connected in series with the resistor R2 between common terminal 10a and the junction point of resistor R1 and capacitor C1. The turns ratio and phasing of the windings N1 and N2 are so selected that a current flowing through N2 and causing a change of flux in magnetic core 13 produces an induced voltage in the winding N1 which is equal and opposite to the voltage causing the original current flow in N2. Hence, during the first portion of applied pulse 20, for example, when the winding N2 presents a high impedance as the core 13 moves from negative to positive saturation, there will be no current flow through the branch C1, N1. From this fact is follows that the input impedance of the network during this initial stage may be controlled through an appropriate choice of the value of resistor R2 which in most applications would be chosen to be very large by comparison with the internal impedance of the pulse source. After the core 13 has been saturated, windings N2 and N1 are effectively decoupled and both become very low impedances. The capacitor C1 is then charged as in the circuit of Figure 1. When the pulse is removed, the discharge of this capacitor again resets the flux in the core 13 to its negative saturation value. It will be noted, that the capacitor C1 may be charged very rapidly once the core is saturated because the large resistor R2 is in shunt rather than in series with this capacitor. Resistor R1 in practice has a much smaller value than R2 and is used merely as a filter and current limiting resistor.

The circuit of Figure 5 may be utilized as a frequency meter in the manner shown in Figure 6. In Figure 6 the stabilized volt-time area output pulses from terminal 12 are passed through an asymmetrical conducting element which, for example, may consist of the rectifier D1, and are applied to an integrating circuit which may consist of resistor R3 and capacitor C3. Values of R3 and C3 are chosen to result in an appropriate time constant in a manner well known in the art. The D.-C. voltage at point 31 will be inversely proportional to the period $T_1$ and directly proportional to the frequency of the applied input pulses. Consequently, a D.-C. meter M connected from point 31 to ground through a resistor R4 may be calibrated to read directly the frequency of the input pulses.

Such a frequency meter may be utilized as an automobile engine tachometer in the manner shown in detail in Figure 7. In Figure 7 there is shown a conventional ignition system of an internal combustion engine comprising a source of electrical potential which may for example, be a storage battery B having its negative pole grounded as shown and its opposite pole connected to the primary 32 of the ignition or spark coil T. The opposite terminal of the primary 32 is connected by conductor 40 through breaker contacts 35, 36, to ground. The contacts 35 and 36 are intermittently closed and opened at a frequency proportional to the speed of the engine by the distributor camshaft 37. The capacitor C4 is connected between conductor 40 and ground and coacts with the inductive reactor 32, to set up a series of high frequency oscillations in a well known manner each time the breaker contacts 35 and 36 are opened. The output circuit of the ignition system includes the secondary 33 of coil T which has one side grounded through battery B and the other side selectively connected to the grounded spark plugs, such as 34 by the rotor 38 of the distributor.

Battery B is charged by a generator G which is driven by the engine in a conventional manner. The output of the generator is connected to the battery circuit as at point 43 through a relay having an arm 39 which is actuated by a core 40 having the usual current winding 41 and voltage winding 42. It is apparent that the output potential of battery B will vary in accordance with its state of charge.

When the frequency meter of Figure 6 is connected to the spark coil as shown at point 11, however the meter circuit is isolated from the varying D.-C. potential of battery B by capacitor C1. It is thus apparent that the accuracy of the frequency meter will not be affected by variations in the potential of the output of battery B, since C1 passes only the pulse waveform, thus performing an isolating, as well as a core reset function.

In Figure 8 there is shown one cycle of the voltage pulse waveform which appears at point 11 when the breaker contacts 35 and 36 are opened. When contacts 35 and 36 are opened condenser C4 is placed in series with inductive reactance 32 and a damped high frequency oscillation results. This oscillation induces a voltage in winding 33 which is applied to the spark plugs 34. It is highly desirable that the amplitude of this voltage be as large as possible to insure firing by the plug. Therefore, the input impedance of the frequency meter circuit at least during this initial oscillating portion of the pulse should be as high as possible. This is achieved, as noted above, through the use of resistor R2 and winding N2. The oscillation is ultimately damped out leaving a steady voltage at point 11 which is shorted out when contacts 35 and 36 are again closed. Thus, in order to be able to count the frequency of the opening and closing of contacts 35 and 36, the frequency meter must be able to extract a constant volt-time area wave from a pulse having the waveform shown in Figure 8.

This is accomplished as has been explained above by the frequency meter of Figure 6 which is redrawn for convenience in Figure 7 and is shown connected to the ignition system at point 11. During the initial oscillatory portion 44a of the pulse 44, the unsaturated core 13, winding N2, and resistor R2 present a high impedance and consequently do not materially load the ignition system. Therefore, the meter does not impair the efficiency of functioning of the ignition system. During the portion 44b of the input pulse, the core 13 is carried from its negative saturation value to its positive saturation value. As explained above, this process requires a fixed amount of flux which in turn implies that a constant minimum volt-time area of input pulse will be required to produce this fixed amount of flux. After reaching positive saturation, winding N1 is decoupled from winding N2 in the manner explained above, point 12 goes essentially to ground potential, and the rest of the input pulse is used to charge capacitor C1. At the end of the portion 44b of the input pulse, capacitor C1 discharges and consequently resets the core 13 to its negative saturation value. When the contacts 35 and 36 are again closed, the entire process is repeated. It therefore follows that the average value of the output pulses as read by meter M from the output of integrating circuit R3, C3 is directly proportional to the frequency of the input pulses and hence to the speed at which the engine is operating.

It will therefore be seen that the circuit affords both D.-C. isolation of the input from the output and a high input impedance which will not interfere with the functioning of the ignition system, as well as an accurate, inexpensive, and dependable means of measuring the speed of operation of the engine.

While the principles of the invention have now been made clear in illustrative embodiments, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim as new and desire to secure by Letters Patent of the United States is:

1. In combination with an internal combustion engine having an ignition system including, a source of electrical energy with one side grounded, a spark coil and a distributor, a first end of said spark coil being periodically grounded by said distributor; a tachometer comprising, a first electric winding having one end grounded and the other end connected to a first end of a resistor, a second electric winding having one end grounded and the other end connected to a first side of a capacitor, a magnetic circuit comprising a substantially rectangular hysteresis loop ferromagnetic material, said first and said second winding being operatively associated with said magnetic circuit; means connecting said first end of said spark coil to the second end of said resistor and to the second side of said capacitor; a rectifier having one end connected to said first side of said capacitor, an integrating circuit connected between ground and the other end of said rectifier, and indicating means connected to read the output of said integrating circuit.

2. A frequency meter comprising, inductive means, comprising a saturable core of a material having a high ratio of remanence to saturation flux density, a capacitor connected in series with said inductive means; a source of electrical input signals comprising individual signal elements each having a magnitude of $\int E dt$ sufficient to drive said core from saturation in a first sense to saturation in a reverse sense connected in electrically exciting relationship with said series connected inductive means and capacitor; an output circuit comprising a rectifier and an integrating circuit connected to derive an output signal from across said inductive means, said capacitor being in electrical series relationship with said source of input signals and said output circuit; and indicating means connected to read the output of said integrating circuit.

3. A frequency meter comprising an electrical network having an input terminal, an output terminal, and a common terminal; a first resistor and a capacitor connected in series between said input terminal and said output terminal, a second resistor and a first electric winding connected in series from the junction point of said first resistor and said capacitor to said common terminal, a second electric winding connected between said output terminal and said common terminal, a magnetic circuit comprising a substantially rectangular hysteresis loop ferromagnetic material, said first and second windings being operatively associated with said magnetic circuit and said first electric winding upon the application of waves to said meter being arranged to induce a voltage in said second winding in opposition to the voltage applied to said second winding while said core material is in unsaturated condition; an integrating circuit, a rectifier connecting said integrating circuit to said output terminal, and indicating means connected to read the output of said integrating circuit.

4. A frequency meter comprising, an electrical network having an input terminal, an output terminal, and a common terminal; a capacitor connected between said input terminal and said output terminal, a first electric winding and a resistance element connected in electrical series relationship between said input terminal and said common terminal, a second electric winding connected between said output terminal and said common terminal, a magnetic circuit comprising a substantially rectangular hysteresis loop ferromagnetic material, said first and second electric windings being operatively associated with said magnetic circuit and said first winding upon the application of waves to said frequency meter being arranged to induce a voltage in said second winding in opposition to the voltage applied to said second winding while said core is in unsaturated condition; an integrating circuit, rectifier means connecting said output terminal to said integrating circuit, and indicating means connected to read the output of said integrating circuit.

5. A frequency meter comprising, an electrical network having an input terminal, an output terminal, and a common terminal; a resistor and a capacitor connected in electrical series relationship between said input terminal and said output terminal, an electric winding connected between said output terminal and said common terminal, a magnetic circuit comprising a saturable core material having a flat topped hysteresis loop, said winding being operatively associated with said magnetic circuit; an integrating circuit, rectifier means connecting said output terminal to said integrating circuit, and indicating means connected to read the output of said integrating circuit.

6. A frequency meter comprising, an electrical network having an input terminal, an output terminal and a common terminal; a capacitor connected between said input terminal and said output terminal, an electric winding connected between said output terminal and said common terminal, a magnetic circuit comprising a saturable core material having a high ratio of remanence to saturation flux density, said winding being operatively associated with said magnetic circuit; an integrating circuit, rectifier means connecting said output terminal to said integrating circuit, and indicating means connected to read the output of said integrating circuit.

7. In combination, inductive means comprising a saturable core of a material having a high ratio of remanence to saturation flux density, a capacitor connected in series with said inductive means; a source of electrical input signals comprising individual signal elements each having a magnitude of $\int Edt$ sufficient to drive said core member from saturation in a first sense to saturation in a reverse sense connected in electrically exciting relationship with said series connected inductive means and capacitor; means comprising a rectifying element connected to derive an output signal from said inductive means, said capacitor being in electrical series relationship with said source of input signals and said means to derive an output signal.

8. An electrical network having an input terminal, an output terminal, and a common terminal; a first resistor and a capacitor connected in series between said input terminal and said output terminal, a second resistor and a first electric winding connected in series from the junction point of said first resistor and said capacitor to said common terminal, a second electric winding connected between said output terminal and said common terminal, a magnetic circuit comprising a substantially rectangular hysteresis loop ferromagnetic material, said first and said second electric windings being operatively associated with said magnetic circuit and said first winding upon the application of signal potentials to said network being arranged to induce a voltage in said second winding in opposition to the voltage applied to said second winding while said core is in unsaturated condition, and rectifier means connecting said output terminal to a work circuit.

9. An electrical network having an input terminal, an output terminal, and a common terminal; a capacitor connected between said input terminal and said output terminal, a first electric winding and a resistance element connected in electrical series relationship between said input terminal and said common terminal, a second electric winding connected between said output terminal and said common terminal, a magnetic circuit comprising a substantially rectangular hysteresis loop ferromagnetic material, said first and second electric windings being operatively associated with said magnetic circuit and said first winding upon the application of signal potentials to said network being arranged to induce a voltage in said second winding in opposition to the voltage applied to said second winding while said core is in unsaturated condition; and a rectifier means connecting said output terminal to a work circuit.

10. An electrical network having an input terminal, an output terminal, and a common terminal; a resistor and a capacitor connected in electrical series relationship between said input terminal and said output terminal, an electric winding connected between said output terminal and said common terminal, a magnetic circuit comprising a saturable core material having a high ratio of remanence to saturation flux density, said winding being operatively associated with the said magnetic circuit; and rectifier means connecting said output terminal to a work circuit.

11. An electrical network having an input terminal, an output terminal, and a common terminal; a capacitor connected between said input terminal and said output terminal, an electric winding connected between said output terminal and said common terminal, a magnetic circuit comprising a saturable core material having a high ratio of remanence to saturation flux density, said winding being operatively associated with said magnetic circuit; and rectifier means connecting said output terminal to a work circuit.

12. In combination, inductive means comprising a saturable core of a material having a high ratio of remanence to saturation flux density, a capacitor connected in series with said inductive means; a source of electrical input signals comprising individual signal elements each having a magnitude of $\int Edt$ sufficient to drive said core from saturation in a first sense to saturation in a reverse sense connected in electrically exciting relationship with said series connected inductive means and capacitor; means to derive an output signal from said inductive means, said capacitor being in electrical series relationship with said source of input signals and said means to derive an output signal.

13. An electrical network having an input terminal, an output terminal, and a common terminal; a first resistor and a capacitor connected in electrical series relationship between said input terminal and said output terminal, a second resistor and a first electric winding connected in series from the junction point of said first resistor and said capacitor to said common terminal, a second electric winding connected between said output terminal and said common terminal, a magnetic circuit comprising a substantially rectangular hysteresis loop ferromagnetic material, said first and said second electric winding being operatively associated with said magnetic circuit and said first winding upon the application of potentials to said network being arranged to induce a voltage in said second winding in opposition to the voltage applied to said second winding while said core material is unsaturated.

14. An electrical network having an input terminal, an output terminal, and a common terminal; a capacitor connected between said input terminal and said output terminal, a first electric winding and a resistance element connected in electrical series relationship between said input terminal and said common terminal, a second electric winding connected between said output terminal and said common terminal, a magnetic circuit comprising a substantially rectangular hysteresis loop ferromagnetic material, said first and second electric windings being operatively associated with said magnetic circuit and said first winding upon the application of potentials to said network being arranged to induce a voltage in said second winding in opposition to the applied voltage while said core is in unsaturated condition.

15. An electrical network having an input terminal, an output terminal, and a common terminal; a resistor and a capacitor connected in electrical series relationship between said input terminal and said output terminal, an electric winding connected between said output terminal and said common terminal, a magnetic circuit and means to derive an output signal coupled to said output terminal comprising a saturable core material having a high ratio of remanence to saturation flux density, said winding being operatively associated with said magnetic circuit.

16. An electrical network having an input terminal, an output terminal, and a common terminal; means for coupling a source of pulses between said input and common terminal having a D.C. path, a magnetic core comprising a saturable core material having a high ratio of remanence to saturation flux density, an electric winding on said core, said winding being connected between said output terminal and said common terminal, capacitance means connected between said input terminal and said output terminal for resetting said core upon discharge thereof through said D.C. path.

17. An electrical network having an input terminal, an output terminal, and a common terminal; means for coupling a source between said input and common terminal having a D.C. path, an electric winding connected between said output terminal and said common terminal, a magnetic circuit comprising a saturable core material having a high ratio of remanence to saturation flux density, said winding being operatively associated with said magnetic circuit, capacitance means connected between said input terminal and said output terminal for resetting said core upon discharge thereof through a circuit including said path.

References Cited in the file of this patent

UNITED STATES PATENTS

| | | |
|---|---|---|
| 2,542,638 | Desch | Feb. 20, 1951 |
| 2,751,553 | McEntee | June 19, 1956 |
| 2,772,396 | Buie | Nov. 27, 1956 |
| 2,803,759 | Kreuder | Aug. 20, 1957 |

FOREIGN PATENTS

| | | |
|---|---|---|
| 310,536 | Switzerland | Dec. 16, 1955 |

UNITED STATES PATENT OFFICE
CERTIFICATION OF CORRECTION

Patent No. 2,962,657                                      November 29, 1960

James R. Horsch

It is hereby certified that error appears in the above numbered patent requiring correction and that the said Letters Patent should read as corrected below.

Column 9, lines 29 to 31, strike out "and means to derive an output signal coupled to said output terminal" and insert the same after "circuit" in line 34, same column 9.

Signed and sealed this 23rd day of May 1961.

(SEAL)
Attest:

ERNEST W. SWIDER                                       DAVID L. LADD

Attesting Officer                                           Commissioner of Patents